US008270007B2

(12) United States Patent
Pandit et al.

(10) Patent No.: US 8,270,007 B2
(45) Date of Patent: Sep. 18, 2012

(54) PRINT JOB ASSIGNMENT METHOD ALLOWING USER-PRIORITIZATION

(75) Inventors: Rakesh Pandit, Irvine, CA (US); Geoff W. Harmon, Mission Viejo, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 1048 days.

(21) Appl. No.: 12/028,971

(22) Filed: Feb. 11, 2008

(65) Prior Publication Data

US 2009/0201531 A1 Aug. 13, 2009

(51) Int. Cl.
- G06K 15/00 (2006.01)
- G06F 3/12 (2006.01)
- G06F 15/00 (2006.01)
- B41J 5/30 (2006.01)
- B41L 13/00 (2006.01)

(52) U.S. Cl. ............... 358/1.15; 358/1.18; 358/1.13; 358/1.9; 358/2.1; 400/62; 101/119

(58) Field of Classification Search .............. 358/1.15, 358/1.18, 1.13, 1.9, 2.1; 101/119; 400/62
See application file for complete search history.

(56) References Cited

U.S. PATENT DOCUMENTS

| 5,727,135 A | 3/1998 | Webb et al. |
| 5,771,800 A * | 6/1998 | Inamine et al. ............... 101/119 |
| 6,592,275 B1 * | 7/2003 | Aihara et al. ............... 358/1.15 |
| 6,762,852 B1 | 7/2004 | Fischer |
| 6,930,795 B1 * | 8/2005 | Motamed et al. ............ 358/1.18 |
| 6,943,905 B2 * | 9/2005 | Ferlitsch ..................... 358/1.13 |
| 7,102,773 B1 * | 9/2006 | Oosterhout et al. ......... 358/1.15 |
| 7,359,076 B2 * | 4/2008 | Uchino ........................ 358/1.15 |
| 7,821,657 B2 * | 10/2010 | Ferlitsch ..................... 358/1.13 |
| 2002/0041395 A1 * | 4/2002 | Kimura ........................ 358/1.15 |
| 2002/0135792 A1 | 9/2002 | Sommer et al. |
| 2003/0144946 A1 * | 7/2003 | Misawa et al. ................ 705/37 |
| 2003/0184799 A1 | 10/2003 | Ferlitsch |
| 2004/0145768 A1 | 7/2004 | Stringham |
| 2005/0180791 A1 * | 8/2005 | Kujirai ........................... 400/61 |

(Continued)

FOREIGN PATENT DOCUMENTS

JP 1999-095940 4/1999

(Continued)

OTHER PUBLICATIONS

Japanese Office Action, dated Aug. 30, 2011, in a related Japanese patent application, No. JP 2007-090224.

*Primary Examiner* — Akwasi M Sarpong
(74) *Attorney, Agent, or Firm* — Chen Yoshimura LLP (57) ABSTRACT

A method implemented in a print job management apparatus for processing print jobs in a multiple-printer print shop environment is described. Each print job specifies job ticket parameters representing printing requirements. Each received job is processed by comparing the printing requirements of the job with capabilities of the printers. If a printer cannot satisfy all printing requirements of the job, it is eliminated as a candidate printer. Then, from all printers that can satisfy all printing requirements of the job, one printer is selected based on a pre-defined priority preference and the job is submitted to the selected printer. The printer priority preference is created by the operator based on cost and other factors. The operator can also select an alternative execution mode where, among all printers that can satisfy all requirements of the job, the one with minimum wait time is selected.

26 Claims, 4 Drawing Sheets

U.S. PATENT DOCUMENTS

| | | |
|---|---|---|
| 2006/0044594 A1 | 3/2006 | Shirai |
| 2006/0050294 A1 | 3/2006 | Smith et al. |
| 2006/0114490 A1* | 6/2006 | Rolleston .................... 358/1.14 |
| 2007/0103719 A1* | 5/2007 | Azuchi ....................... 358/1.15 |
| 2007/0229879 A1* | 10/2007 | Harmon et al. ............. 358/1.15 |
| 2007/0229880 A1 | 10/2007 | Harmon et al. |
| 2007/0236725 A1* | 10/2007 | Harmon et al. ............. 358/1.15 |
| 2008/0030772 A1* | 2/2008 | Shirai ......................... 358/1.15 |

FOREIGN PATENT DOCUMENTS

| | | |
|---|---|---|
| JP | 2000-010741 | 1/2000 |
| JP | 2004-213393 | 7/2004 |

* cited by examiner

PRINT JOB ASSIGNMENT METHOD ALLOWING USER-PRIORITIZATION

This application cross-references and incorporates by reference in its entirety U.S. patent application Ser. No. 11/395,520, filed on Mar. 31, 2006, entitled "PRINT JOB ANALYZING METHOD AND APPARATUS" by Geoff W. HARMON, Toshiro FUJIMORI, Rakesh PANDIT, and Shigenori MATSUBARA.

BACKGROUND OF THE INVENTION

1. Field of the Invention

This invention relates to print job processing method and apparatus, and more particularly, to print job processing method and apparatus for a print shop employing multiple printers.

2. Description of Related Art

In an environment that processes a large number of print jobs with multiple printers, there has been a need to manage print jobs efficiently in an organized fashion. Examples of such an environment are professional print shops and print/copy departments at large organizations, where a variety of print requests, such as large-volume duplication and large document printing, needs to be processed and completed by utilizing multiple printers within a short turn-around time. These environments are collectively referred to as "print shops" in this application. Typically, each printing job specifies a source file that electrically contains a document to be printed, the size, color and the type of the paper on which the document should be printed, the printing resolution, duplex or single-side printing, and certain finishing conditions, such as book, staple, collate printing, etc., depending on a print job requester's needs. In order to process a large volume of print jobs that each differ in terms of these job parameters, a print shop utilizes multiple commercial grade printers. Typically, one or more black & white (B&W) printers are in operation to process B&W printing. Color printers are also installed to handle color printing. Each of these printers, however, has limitations on available printer settings, such as the paper size, the paper type, resolution settings, etc. When a large volume of printing jobs is to be handled with multiple B&W and color printers, it is a daunting task to assign each printing job to an appropriate printer.

SUMMARY OF THE INVENTION

Accordingly, the present invention is directed to a print job processing method and apparatus that substantially obviates one or more of the problems due to limitations and disadvantages of the related art.

An object of the present invention is to provide an improved print job processing method and apparatus.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present invention provides a method for processing a print job implemented in a print job management apparatus for managing a plurality of printing devices, which includes: (a) receiving a print job, the print job specifying job ticket parameters representing printing requirements; (b) for each of the plurality of printing devices, determining whether the printing device satisfies all printing requirements of the print job; (c) from all printing devices that are determined to satisfy all printing requirements of the print job, selecting a printing device based on a priority preference of printing devices pre-defined by an operator; and (d) submitting the print job to the selected printing device for printing.

In another aspect, the present invention provides a computer program product including a computer usable medium having a computer readable code embodied therein for controlling a data processing apparatus connected to a plurality of printing devices, the computer readable program code being configured to cause the data processing apparatus to execute the above process for processing a print job.

It is to be understood that both the foregoing general description and the following detailed description are exemplary and explanatory, and are intended to provide further explanation of the invention as claimed.

DETAILED DESCRIPTION OF THE PREFERRED EMBODIMENTS

Embodiments of the present invention provide a method for automatically assigning print jobs to printers in a print shop environment. An algorithm is used to examine the print job requirements and the capabilities of the printers, and to determine how to assigned the print job to printers. Using this method, a large number of print jobs can be speedily and efficiently processed.

Figure 1:
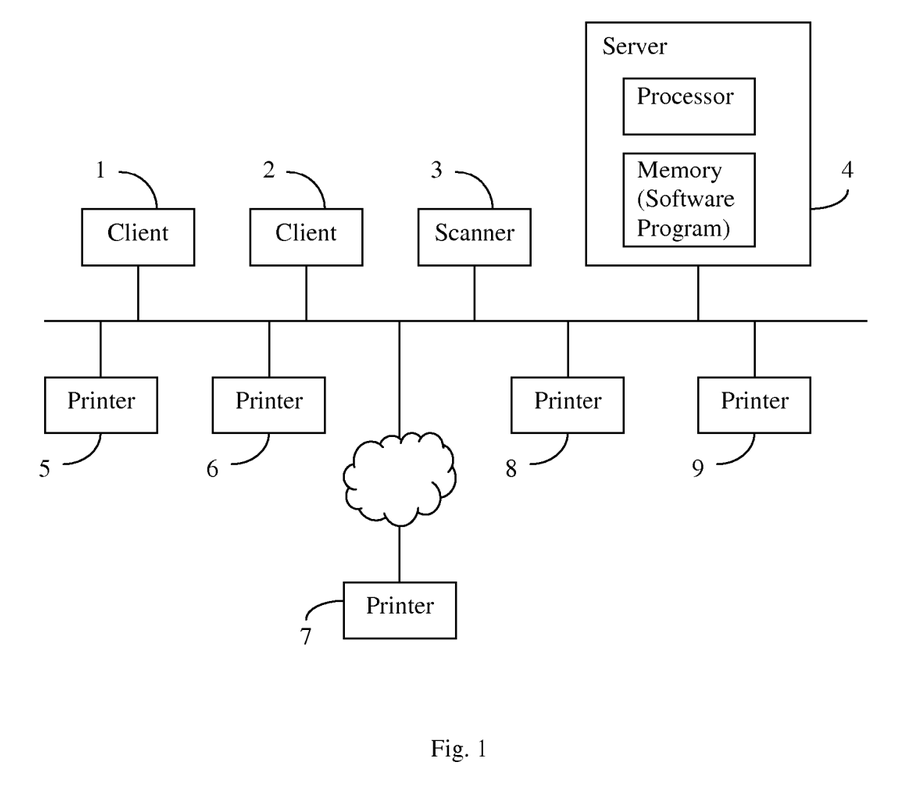
FIG. 1 schematically illustrates a print management system having multiple printers and a print job management server in which embodiments of the present invention can be implemented.

FIG. 1 illustrates an example of a print shop having multiple printers, where embodiments of the present invention may be implemented. In the print shop system, client computers 1 and 2 are connected to a server 4 via a local area network (LAN). Scanner 3 is also connected to server 4 via the LAN. In this example, B&W printers 5, 6, and 7 and color printers 8 and 9 are connected to the server through the LAN. In this example, printers 5-9 are commercial standard high-end printers that can handle high speed, high quality printing. Each of the printers 5-9 has multiple paper trays to store paper of various sizes, color, and types. Further, some of the printers 5-9 are equipped with a sophisticated output sorting mechanism with multiple output trays to perform collate printing or other print finishing functions. Each printer has one or more display monitors to display the status of the printing and various warning and instruction messages to a user. Each printer is equipped with its own central processing unit (CPU) and appropriate hardware/software to control its own printing operations, and communicates with server 4 via a LAN. Some of these printers may also be multifunction printers that can perform copying and scanning of documents. Appropriate server software is installed in server 4 to perform various standard network administrative functions.

According to embodiments of the present invention, in addition to the server administrative software, print job management software is installed on server 4 for managing a large number of print jobs that come into the print shop. The print job management software may be stored in either of a read only memory (ROM) or a hard disk drive (HDD), which can be accessed by the CPU of the server 4. Once a print shop operator calls the print job management software, server 4 reads out the print job management software from the ROM or HDD to a random access memory (RAM) of the server to carry out various functions of the software, including management of print jobs. The print job management software preferably is designed to run on Windows OS, Macintosh OS, or Unix X Windows or other computer operating systems implementing a GUI (graphic user interface), such as a touchscreen and/or a mouse and a keyboard, coupled with a display monitor. Server 4 (or any suitable data processing apparatus) running print job management software of embodiments of the present invention is hereinafter referred to as "print job management server." In this application, the terms "print job management server" and "print job management apparatus" broadly refer to any data processing apparatus that can implement various features of embodiments of the present invention described below with appropriate hardware/software.

A print job is a print request specifying various desired options or requirements together with one or more documents to be printed. For example, a customer may bring a floppy diskette containing a file in the PDF format for printing with a particular finishing option. The print shop operator asks the customer what kind of print jobs is desired to figure out print job parameters. Alternatively, the customer may be asked to fill out a questionnaire sheet to describe what print options he/she desires. For example, the customer may desire that the document be printed on 24 lb 25% cotton letter size paper in full color in the double-sided printing mode in the amount of 100 copies. The print shop operator then records these job parameter values along with customer information as a file and stores the file and the source PDF file onto the hard disk drive or other secured storage device so that the print job parameters are associated with the file.

Print jobs also may be generated by a customer's requests to copy a document. When a customer brings a document for copying, the shop operator scans the document using scanner 3 (which may be a color and/or B&W scanner) and converts the document into a digital file and thereafter creates a data file associated with the scanned source document in a manner similar to above.

Theses data files representing print jobs and associated files are forwarded to server 4. This way, numerous print jobs are generated and collected by server 4 on which print job management software is running. The print job management server 4 running print job management software receives the print job files, analyzes and processes the print jobs, and submits them to a printing device for printing and (if required) finishing.

The printing devices to which the server 4 assigns print jobs include printers and clusters. A printer is an actual physical printer (which may include finishing functions such as stapling) that is connected to the server 4. A cluster is a software-defined virtual printing device designed to perform a certain class of print jobs more efficiently and accurately. It is a combination of two or more printers with specified rules or algorithm. When a print job is assigned to a cluster, the print job is split into two or more jobs by a preset or user-defined rule or algorithm, and the divided jobs are processed by the respective printers and/or finishing devices designated by the cluster. For example, suppose that a print job containing 10 color pages and 20 B&W pages is submitted to a cluster that combines Color Printer 1 and BW Printer 1 with a rule requiring all color pages to be printed by Color Printer 1 and all B&W pages to be printed by B&W Printer 1. Then, the print job is divided into sub-job 1 containing all color pages and sub-job 2 containing the remaining B&W pages. Thereafter, sub-job 1 is sent to the Color Printer 1 and sub-job 2 is sent to B&W Printer 2 for respective printing operations. Another example of a cluster, sometimes referred to as a quantity-type cluster, is one that includes a number of B&W printers having similar capabilities that are used to print large volume print jobs. The printers and printers within a cluster may also include online finishing devices, i.e., finishing device (sorters, staplers, etc.) that are mechanically and electrically associated with a printer.

In embodiments of the present invention, print jobs are organized by using database entries, called "job tickets." A job ticket specifies values of various print job parameters, and associates itself to the source file(s). In one particular example, a job ticket may include a job ticket number, ticket name as well as the values of the following groups of various other job parameters: job information settings, basic settings, layout settings, cover sheet, finishing settings, inter-sheet settings, tab-paper settings, image quality settings, and customer information. Job information settings include job name, submit time, completed time, due date, type (print or copy), priority, the identity of the person who created the job ticket, job location, etc. Job information settings further include the directory pass at which the file containing the document to be printed is located in a local or networked hard drive, the number of B&W pages, the number of color pages, and special instructions. Basic settings include the number of copies to be made, the orientation of paper (portrait or landscape), information on collate printing, information on offset printing, the original paper size, the output paper size, the paper type, and paper source information, such as tray numbers. Layout settings include settings concerning print layout. Cover sheet includes settings on cover sheets to be produced or prepared. Finishing settings specify paper finishing settings, including the paper binding options, such as stitch, staple, and punch.

Based on instructions and information received from a customer, a print shop operator may manually enter the values of these job parameters using a job ticket editor, which is a graphic user interface (GUI). In addition, the server 4 may be configured to access and analyze the source file to determine the values of some of the job parameter directly from the source file. Then the server enters these values in the corresponding job parameter entries in the corresponding job ticket without requiring a user to manually enter them. This will help eliminate clerical errors and further facilitate the operation of the print shop.

In this application, the term "value" means, when referred to with respect to variables or parameters, any numerical quantity, characters, and other types of entries that can specify variables or parameters, and including, but not limited to, a specific setting of any of the job parameters appeared herein.

Figure 2A:
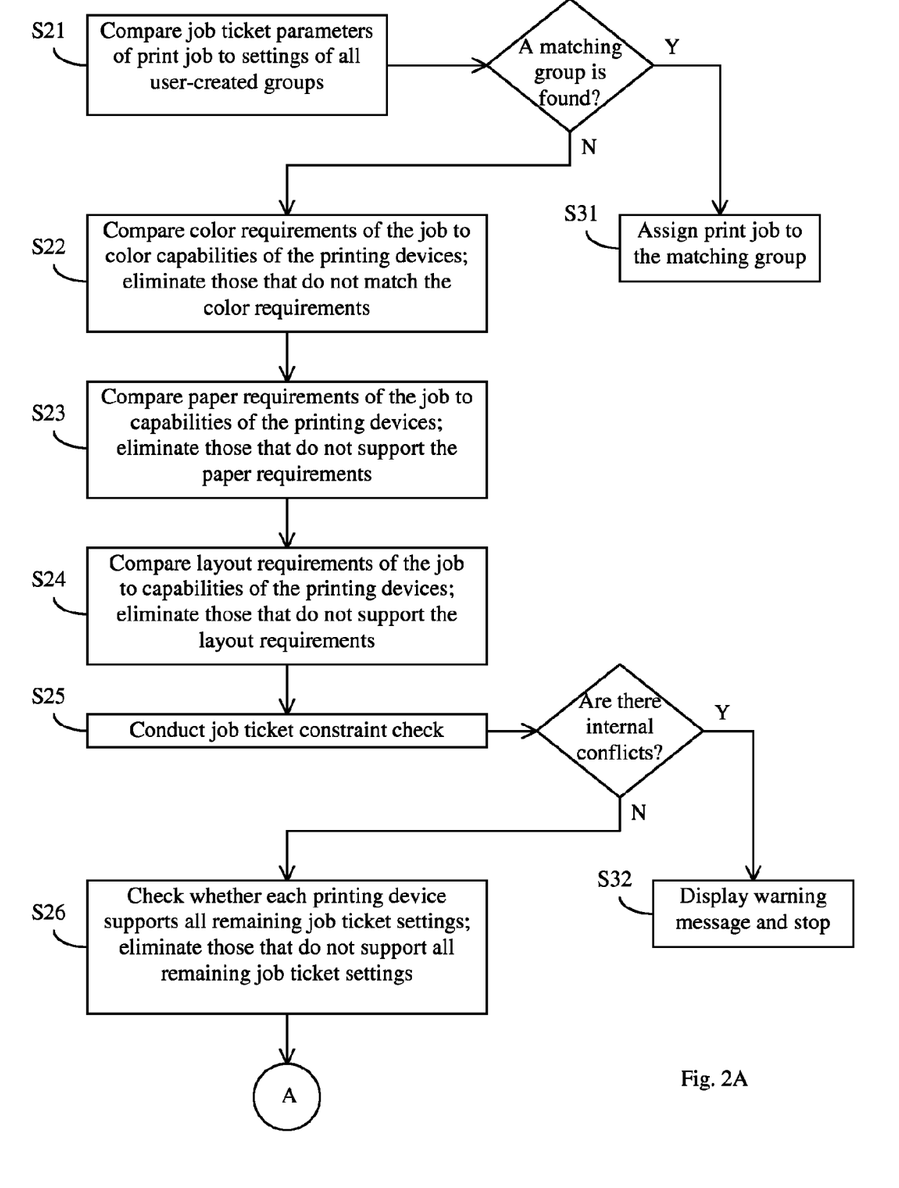
FIGS. 2A and 2B illustrate a process for automatically assigning print jobs to a printing device according to an embodiment of the present invention.
Figure 2B:
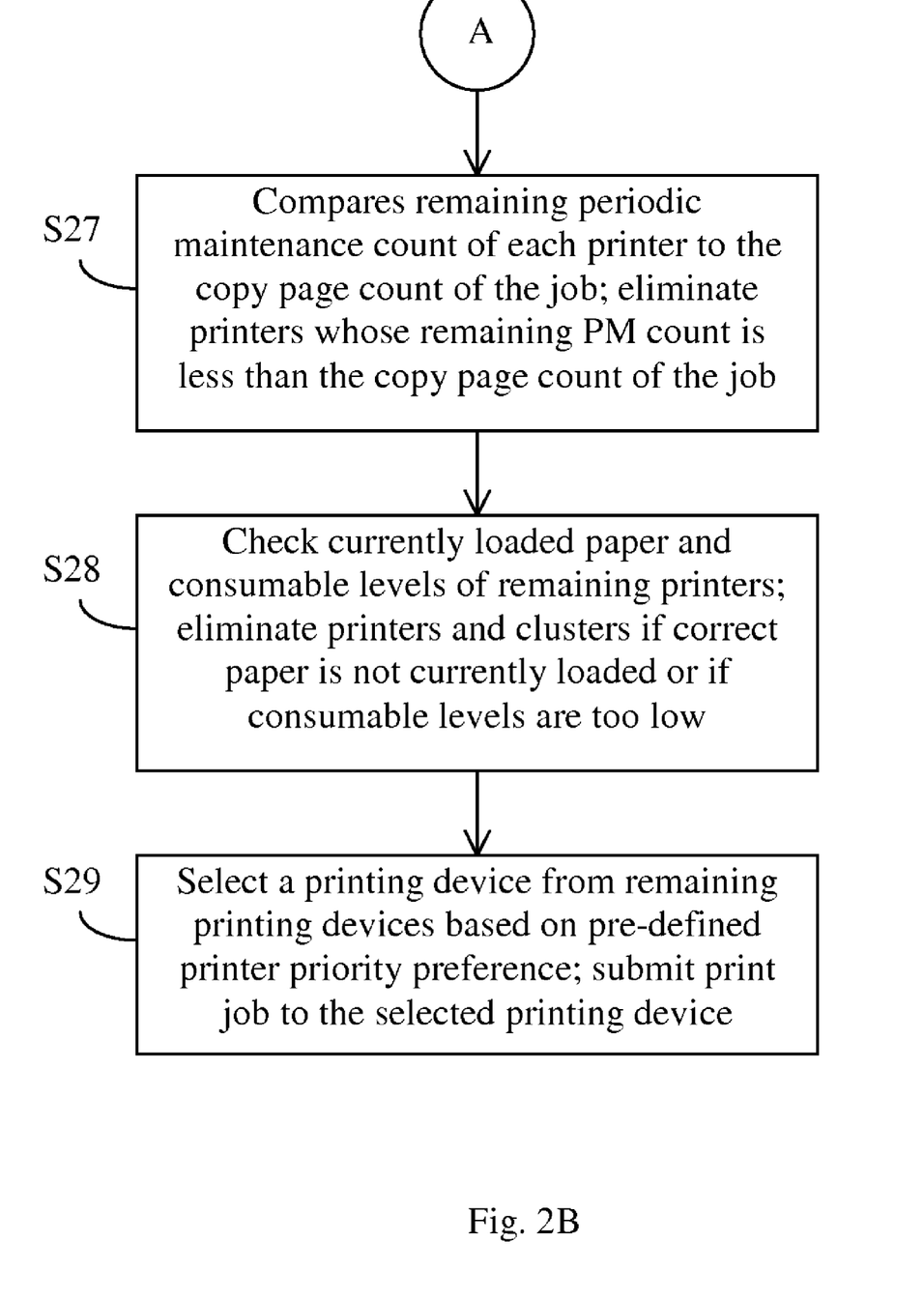

Each day, a print shop receives a large number of new print jobs specifying a variety of printing requirements. As arrived, these print jobs are not organized, yet they must be processed promptly and accurately. The print job management server analyzes incoming print jobs and automatically assigns them to the appropriate printing device for printing. FIGS. 2A and 2B illustrate a process executed by the print job management software running on the server for analyzing job ticker parameters to determine which printing device the job will be assigned to.

The first step in the automatic print job assignment process is job grouping, i.e., assigning print jobs to pre-defined job groups (step S21). A job group is a holding folder that has one or more job ticket parameters associated with it. The purpose of a group is to collect multiple print jobs that share the same pre-defined characteristics and then batch process them at one time, when there are enough jobs. This allows for more efficient use of a printer. Job groups are defined by the operator prior to starting the assignment process. In step S21, the server compares the job ticket parameters of a print job to the specified parameters of all pre-defined job groups. If a match is found, the job is assigned to that group (step S31). A match means that the print job has all of the requirements of a group, even though the job may have other requirements not specified for the group. Jobs assigned to a group can be processed manually, i.e., the operator can manually assign all jobs in the group to a particular printer.

If a job is not assigned to any group because it does not match the group criteria, the server next examines the color requirements (color intent) of the job, and compares them to the color capabilities of the printers and clusters managed by the server (step S22). Printers or clusters that do not match the color requirements of the print job are eliminated as possible candidate printing devices for the print job. Then, the server considers the paper requirements of the print job such as paper size, paper weight, and paper type (step S23). If any of the remaining printers or clusters does not support these paper settings, the printer or cluster is eliminated as a candidate device. Next, the server checks the layout support of the remaining printers and clusters (step S24). Examples of layout options include: single-sided, double-sided, adhesive bind and booklet. Printers or clusters that cannot process the specified layout setting of the print job are eliminated as candidate devices.

The server next conducts a job ticket constraint check to determine if the job ticket itself contains any settings that create any internal conflicts (i.e. inconsistent job requirements) (step S25). For example, if staple and Z-fold are both specified for the job, it is considered an internal conflict. If an internal conflict is found, the job cannot be assigned to any printing device, and the server notifies the operator of such conflicts. This situation requires the operator to modify the job ticket to resolve the internal conflict. Thus, the server displays a warning message and stops processing that print job (step S32).

The server also conducts a printer constraint check for each printer to see if the printing device supports all the remaining job ticket settings (step S26). If a printing device cannot support all job ticket settings, the printing device is eliminated as a candidate printing device.

Next, the server checks the periodic maintenance count of each remaining printer and printers assigned to clusters, and compares the remaining periodic maintenance count to the copy page count of the print job (step S27). The copy page count is the total number of pages in the print job to be printed. In the case of a cluster that includes two or more printers which will print different parts of the print job, for example, a B&W printer to print the B&W pages and a color printer to print the color pages of the print job, the copy page count include the total number of pages for each respective printer, e.g., the number of total B&W pages and the number of total color pages, respectively. The periodic maintenance count (PM) is a number that indicates the number of pages that has been printed by a printer during the current maintenance period. Each printer is scheduled to print a certain number of pages before the next periodic maintenance is conducted. Thus, the remaining PM count indicates the number of pages a printer can print before maintenance. If the copy page count of the print job exceeds the remaining PM count of a printer, that printer and the cluster that the printer belongs to are eliminated as candidate printing devices.

The server then considers each of the remaining printers and printers assigned to clusters, and checks the paper size and type of the paper currently loaded in the printer as well as consumable levels (step S28). While step S23 checks for printer's capability to support the required paper size and type, step S28 checks whether the paper size and type required by the print jot are actually loaded in the printer. Consumables include, for example, toner, staples, etc. If the correct paper is not currently loaded in a printer or if consumable levels are insufficient, the server eliminates the printer and the cluster it belongs to. The server may also generate a warning message to indicate this fact. The purpose of the warning message is that, in the event the automatic print job assignment process fails to assign the print job to any printing device (i.e. no printing device satisfies all requirements of the print job), the operator may nevertheless manually assign the print job to the printing device despite the warning message, or he may correct the problem (e.g. load the correct paper) and then manually assign the print job to that printing device.

In steps S22, S23, S24 and S26, the capabilities of a cluster depend on the capabilities of the individual printers in the cluster and the algorithm that define how they share tasks. For example, for a cluster that includes a B&W printer and a color printer, with an algorithm specifying how the color and B&W pages of a print job is to be printed by the two printers, the cluster is considered to have a color printing capability for purpose of step S22. In another example, a quantity-type cluster includes a number of B&W printers with an algorithm specifying how multiple copies of a print job is to be printed by the number of printers. If the print job requires hole-punching but not all of the printers in the cluster have hole-punching capabilities, then the cluster cannot support the hole-punching requirement of the job and will be eliminated in step S26.

After steps S21 through S28, a number of printing devices may remain as candidate printing devices, all of which will be able to satisfy all printing requirements of the print job. Among the remaining candidate printing devices, the server selects one printing device based on a pre-defined printer priority preference, and submits the print job to the selected printing device (step S29). Thus, by using the above described method, the server automatically assigns each print job to a printing device, and automatically submits the job to that printing device for printing.

The printer priority preference is a priority list previously created by the operator. It specifies an order in which printing devices are to be selected by the server if multiple printers can handle the print job. One reason for using such a pre-defined printer priority preference in step S29 is that while two or more printers are capable of handling the print job, there may be other factors that cause the print shop to favor one printer over another. In an illustrative example, the print shop has two Model 1 printers and a Model 2 printer, all black and white printers. The cost of operation of these two models of printers is not identical: Model 2 is more expensive to print on. Additionally, the two Model 1 printers have different PM servicing agreements or PM counts, making it advisable for the print shop operator to favor one over the other. It is therefore advantageous for to allow the operator to create a printer priority preference which reflects the print shop's preferences of printer use.

The printer priority preference is created prior to the server starting the process of assigning jobs to printing devices. The server management software may provide a GUI for the operator to edit an ordered list of printers as the printer priority preference. In an illustrative example, the operator creates a list of printers as the printer priority preference: Printer A in the first position, Printer B in the second position, and Printer C in the third position. When the server executes the print job assignment process, steps S21 through S28 result in Printer B and Printer C both being candidates for processing the job. In step S29, the server selects Printer B to assign the print job to, since it is in a higher position than Printer C in the pre-defined printer priority preference.

Figure 3:
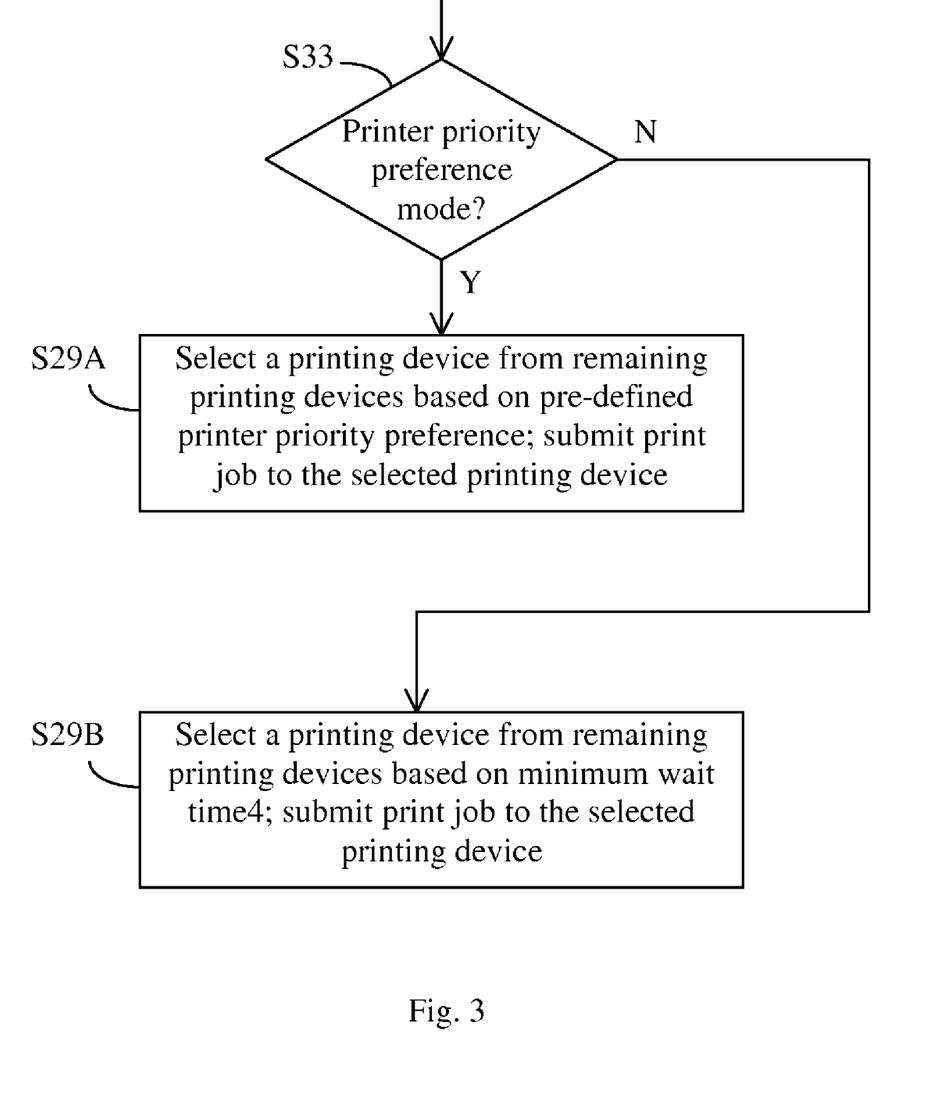
FIG. 3 illustrates a process for automatically assigning print jobs to a printing device according to an alternative embodiment of the present invention.

In an alternative embodiment, the operator can choose to execute the print job assignment process in one of two alternative selection modes: a printer priority preference mode or a minimum wait time mode. Steps S21 to S28 shown in FIGS. 2A and 2B are common steps for both modes. After performing steps S21 through S28, two or more printing devices may be remaining as candidate printing devices. Then, as shown in FIG. 3, the server determines the selection mode (step S33). If the process is running in the printer priority preference mode ("Y" in step S33), the server selects a printing device based on the pre-defined printer priority preference, and submits the print job to the selected printing device (step S29A). Step S29A is the same as step S29 in FIG. 2B. If the process is running in the minimum wait time mode ("N" in step S33), the server selects, from the remaining candidate printing devices, the printing device that has the lowest wait time, and submits the print job to the selected printing device (step S29B). This can be done by examining the "time remaining" count of each printer. If two or more printers have the same wait time, the server will select one of them based on a default order.

During execution of the print job assignment process shown in FIGS. 2A, 2B and 3, the progress of process may be displayed on a GUI of the print job management software. For example, the GUI may show a list of all available printers and clusters, and as a printer or cluster is eliminated in one of the steps S21 through S29, the effect is indicated on the GUI, for example, by graying out the eliminated printing device in the list.

While the embodiments have been described as being applied in a print shop environment, the invention is not limited to any physical setting of a shop or network, and can be applied to a print shop system having a distributed setting where printers at different locations are connected to a server. In particular, it should be apparent that one or more of the components of the print shop system can communicate with the rest of the system via virtual private network (VPN) or similar means through the Internet. Moreover, referring to FIG. 1, although the server 4 of the above examples functions as the print job management server as well as the network server, a separate stand-alone computer may be provided to run the print job management software. In the alternative, when properly configured, one of the client computers 1 and 2 or the computers attached to one of the printers 5-9 (if such a printer exists among them) may be used to assume the role of the print job management server. Further, although a Windows based server computer with appropriate software has been described above as an example, a print management system of the present invention can be implemented in a proprietary hardware system that is specifically designed to perform the above-described various functionalities of the print management system.

It will be apparent to those skilled in the art that various modification and variations can be made in the print job assignment method and apparatus of the present invention without departing from the spirit or scope of the invention. Thus, it is intended that the present invention cover modifications and variations that come within the scope of the appended claims and their equivalents.

What is claimed is:

1. A method for processing a print job implemented in a print job management apparatus for managing a plurality of printing devices, the method comprising:
   (a) receiving a print job, the print job specifying job ticket parameters representing printing requirements;
   (b) determining whether the job ticket parameters match settings of each of one or more pre-defined groups, wherein each group defines a printing device to print jobs assigned to that group;
   (c) if the job ticket parameters match the settings of a pre-defined group, assigning the print job to the matching group;
   (d1) for each of the plurality of printing devices, determining whether the printing device satisfies all printing requirements of the print job;
   (d2) from all printing devices that are determined to satisfy all printing requirements of the print job, selecting a printing device based on a priority preference of printing devices pre-defined by an operator; and
   (d3) submitting the print job to the selected printing device for printing;
   wherein steps (d1), (d2) and (d3) are performed if the job ticket parameters do not match the setting of any pre-defined group.

2. The method of claim 1, wherein the printing requirements include color requirements, paper requirements, and layout requirements, and wherein step (d1) comprises:
   (d1-1) comparing the color requirements of the print job to color capabilities of the printing device;
   (d1-2) comparing the paper requirements of the print job to paper capabilities of the printing device; and
   (d1-3) comparing the layout requirements of the print job to layout capabilities of the printing device.

3. The method of claim 2, wherein step (d1) further comprises:
   (d1-4) comparing a copy page count of the print job with a remaining periodic maintenance count for the printing device.

4. The method of claim 3, wherein step (d1) further comprises:
   (d1-5) determining whether paper having correct paper size and type is currently loaded in the printing device; and
   (d1-6) determining if the printing device has sufficient levels of consumables.

5. The method of claim 1, further comprising:
   (e) before step (d2), conducting a job ticket constraint check to determine if the job ticket parameters create any internal conflict; and
   (f) if the job ticket parameters create any internal conflict, displaying a warning message;
   wherein steps (d2) and (d3) are performed only if the job ticket parameters create no internal conflict.

6. The method of claim 1, further comprising:
   (g) determining a selection mode previously specified by an operator; and
   (h) if the selection mode is a first mode, selecting, from all printing devices that are determined in step (d1) to satisfy all printing requirements of the print job, a printing device that has a lowest wait time,
   wherein step (d3) is performed if the selection mode is a second mode.

7. A computer program product comprising a non-transitory computer usable medium having a computer readable code embodied therein for controlling a data processing apparatus for managing a plurality of printing devices, the computer readable program code being configured to cause the data processing apparatus to execute a process for processing a print job, the process comprising:
  (a) receiving a print job, the print job specifying job ticket parameters representing printing requirements;
  (b) determining whether the job ticket parameters match settings of each of one or more pre-defined groups, wherein each group defines a printing device to print jobs assigned to that group;
  (c) if the job ticket parameters match the settings of a pre-defined group, assigning the print job to the matching group;
  (d1) for each of the plurality of printing devices, determining whether the printing device satisfies all printing requirements of the print job;
  (d2) from all printing devices that are determined to satisfy all printing requirements of the print job, selecting a printing device based on a priority preference of printing devices pre-defined by an operator; and
  (d3) submitting the print job to the selected printing device for printing;
  wherein steps (d1), (d2) and (d3) are performed if the job ticket parameters do not match the setting of any pre-defined group.

8. The computer program product of claim 7, wherein the printing requirements include color requirements, paper requirements, and layout requirements, and wherein step (d1) comprises:
  (d1-1) comparing the color requirements of the print job to color capabilities of the printing device;
  (d1-2) comparing the paper requirements of the print job to paper capabilities of the printing device; and
  (d1-3) comparing the layout requirements of the print job to layout capabilities of the printing device.

9. The computer program product of claim 8, wherein step (d1) further comprises:
  (d1-4) comparing a copy page count of the print job with a remaining periodic maintenance count for the printing device.

10. The computer program product of claim 9, wherein step (d1) further comprises:
  (d1-5) determining whether paper having correct paper size and type is currently loaded in the printing device; and
  (d1-6) determining if the printing device has sufficient levels of consumables.

11. The computer program product of claim 7, wherein the process further comprises:
  (e) before step (d2), conducting a job ticket constraint check to determine if the job ticket parameters create any internal conflict; and
  (f) if the job ticket parameters create any internal conflict, displaying a warning message;
  wherein steps (d2) and (d3) are performed only if the job ticket parameters create no internal conflict.

12. The computer program product of claim 7, wherein the process further comprises:
  (g) determining a selection mode previously specified by an operator; and
  (h) if the selection mode is a first mode, selecting, from all printing devices that are determined in step (d1) to satisfy all printing requirements of the print job, a printing device that has a lowest wait time,
  wherein step (d3) is performed if the selection mode is a second mode.

13. A method for processing a print job implemented in a print job management apparatus for managing a plurality of printing devices, the method comprising:
  (a) receiving a print job, the print job specifying job ticket parameters representing printing requirements;
  (b) determining whether the print job match criteria of each of one or more pre-defined groups, wherein each group defines a printing device to print jobs assigned to that group;
  (c) if the print job match the criteria of a pre-defined group, assigning the print job to the matching group;
  (d) if the print job does not match the criteria of any pre-defined group,
  (d1) for each of the plurality of printing devices, determining whether the printing device satisfies all printing requirements of the print job;
  (d2) from all printing devices that are determined to satisfy all printing requirements of the print job, selecting a printing device based on a priority preference of printing devices pre-defined by an operator.

14. The method of claim 13, further comprising:
  (d3) submitting the print job to the selected printing device for printing.

15. The method of claim 13, wherein the printing requirements include color requirements, paper requirements, and layout requirements, and wherein step (d1) comprises:
  (d1-1) comparing the color requirements of the print job to color capabilities of the printing device;
  (d1-2) comparing the paper requirements of the print job to paper capabilities of the printing device; and
  (d1-3) comparing the layout requirements of the print job to layout capabilities of the printing device.

16. The method of claim 15, wherein step (d1) further comprises:
  (d1-4) comparing a copy page count of the print job with a remaining periodic maintenance count for the printing device.

17. The method of claim 16, wherein step (d1) further comprises:
  (d1-5) determining whether paper having correct paper size and type is currently loaded in the printing device; and
  (d1-6) determining if the printing device has sufficient levels of consumables.

18. The method of claim 14, further comprising:
  (e) before step (d2), conducting a print constraint check to determine if the job ticket parameters create any internal conflict; and
  (f) if the job ticket parameters create any internal conflict, displaying a warning message;
  wherein steps (d2) and (d3) are performed only if the job ticket parameters create no internal conflict.

19. The method of claim 14, further comprising:
  (g) determining a selection mode previously specified by an operator; and
  (h) if the selection mode is a first mode, selecting, from all printing devices that are determined in step (d1) to satisfy all printing requirements of the print job, a printing device that has a lowest wait time,
  wherein step (d3) is performed if the selection mode is a second mode.

20. A computer program product comprising a non-transitory computer usable medium having a computer readable code embodied therein for controlling a data processing apparatus for managing a plurality of printing devices, the computer readable program code being configured to cause the data processing apparatus to execute a process for processing a print job, the process comprising:

(a) receiving a print job, the print job specifying job ticket parameters representing printing requirements;

(b) determining whether the job ticket parameters match settings of each of one or more pre-defined groups, wherein each group defines a printing device to print jobs assigned to that group;

(c) if the job ticket parameters match the settings of a pre-defined group, assigning the print job to the matching group;

(d) if the job ticket parameters do not match the setting of any pre-defined group, (d1) for each of the plurality of printing devices, determining whether the printing device satisfies all printing requirements of the print job;

(d2) from all printing devices that are determined to satisfy all printing requirements of the print job, selecting a printing device based on a priority preference of printing devices pre-defined by an operator.

21. The computer program product of claim 20, further comprising:

(d3) submitting the print job to the selected printing device for printing.

22. The computer program product of claim 20, wherein the printing requirements include color requirements, paper requirements, and layout requirements, and wherein step (d1) comprises:

(d1-1) comparing the color requirements of the print job to color capabilities of the printing device;

(d1-2) comparing the paper requirements of the print job to paper capabilities of the printing device; and (d1-3) comparing the layout requirements of the print job to layout capabilities of the printing device.

23. The computer program product of claim 22, wherein step (d1) further comprises:

(d1-4) comparing a copy page count of the print job with a remaining periodic maintenance count for the printing device.

24. The computer program product of claim 23, wherein step (d1) further comprises:

(d1-5) determining whether paper having correct paper size and type is currently loaded in the printing device; and (d1-6) determining if the printing device has sufficient levels of consumables.

25. The computer program product of claim 21, wherein the process further comprises:

(e) before step (d2), conducting a job ticket constraint check to determine if the job ticket parameters create any internal conflict; and (f) if the job ticket parameters create any internal conflict, displaying a warning message;

wherein steps (d2) and (d3) are performed only if the job ticket parameters create no internal conflict.

26. The computer program product of claim 21, wherein the process further comprises:

(g) determining a selection mode previously specified by an operator; and (h) if the selection mode is a first mode, selecting, from all printing devices that are determined in step (d1) to satisfy all printing requirements of the print job, a printing device that has a lowest wait time, wherein step (d3) is performed if the selection mode is a second mode.

* * * * *